US011200430B2

(12) United States Patent
Luo et al.

(10) Patent No.: US 11,200,430 B2
(45) Date of Patent: Dec. 14, 2021

(54) SYSTEMS AND METHODS FOR DETECTING TRAILER ANGLE

(71) Applicant: TuSimple, Inc., San Diego, CA (US)

(72) Inventors: Yi Luo, San Diego, CA (US); Xiaoling Han, San Diego, CA (US); Xue Mei, Ann Arbor, MI (US)

(73) Assignee: TUSIMPLE, INC., San Diego, CA (US)

( * ) Notice: Subject to any disclaimer, the term of this patent is extended or adjusted under 35 U.S.C. 154(b) by 299 days.

(21) Appl. No.: 16/181,020

(22) Filed: Nov. 5, 2018

(65) Prior Publication Data

US 2020/0143174 A1 May 7, 2020

(51) Int. Cl.
*G06K 9/00* (2006.01)
*G01S 17/93* (2020.01)
(Continued)

(52) U.S. Cl.
CPC .......... *G06K 9/00798* (2013.01); *G01S 17/42* (2013.01); *G01S 17/931* (2020.01); *G06T 7/73* (2017.01); *G08G 1/167* (2013.01); *B60R 1/002* (2013.01); *G06T 2207/30204* (2013.01); *G06T 2207/30256* (2013.01)

(58) Field of Classification Search
CPC .......... B60D 1/62; B60R 1/002; B62D 13/06; B62D 15/023; G01S 17/42; G01S 17/931; G06K 9/00798; G06T 2207/10028; G06T 2207/30204; G06T 2207/30252;
(Continued)

(56) References Cited

U.S. PATENT DOCUMENTS 9,476,705 B2 * 10/2016 Stroila ................ G09B 29/008
2013/0121564 A1 * 5/2013 Kitamura ............ G01B 11/24
382/154
(Continued)

FOREIGN PATENT DOCUMENTS

CN 106225723 A * 12/2016
CN 106225723 A 12/2016

OTHER PUBLICATIONS

Fuchs, Christian, et al. "Advanced 3-D trailer pose estimation for articulated vehicles." *2015 IEEE Intelligent Vehicles Symposium (IV)*. IEEE, 2015.
(Continued)

*Primary Examiner* — Michael J Vanchy, Jr.
(74) *Attorney, Agent, or Firm* — Paul Liu; Knobbe, Martens, Olson & Bear, LLP

(57) ABSTRACT

Systems and methods for detecting trailer angle are provided. In one aspect, an in-vehicle control system includes an optical sensor configured to be mounted on a tractor so as to face a trailer coupled to the tractor, the optical sensor further configured to generate optical data indicative of an angle formed between the trailer and the tractor. The system further includes a processor and a computer-readable memory in communication with the processor and having stored thereon computer-executable instructions to cause the processor to receive the optical data from the optical sensor, determine at least one candidate plane representative of a surface of the trailer visible in the optical data based on the optical data, and determine an angle between the trailer and the tractor based on the at least one candidate plane.

20 Claims, 5 Drawing Sheets

(51) Int. Cl.
    *G01S 17/42*     (2006.01)
    *G08G 1/16*      (2006.01)
    *G06T 7/73*      (2017.01)
    *G01S 17/931*    (2020.01)
    *B60R 1/00*      (2006.01)

(58) Field of Classification Search
    CPC ... G06T 2207/30256; G06T 7/73; G06T 7/75; G08G 1/167
    See application file for complete search history.

(56) References Cited

U.S. PATENT DOCUMENTS

| | | | |
|---|---|---|---|
| 2016/0368336 A1 | 12/2016 | Kahn et al. | |
| 2018/0040129 A1* | 2/2018 | Dotzler | B60R 11/04 |
| 2019/0129429 A1* | 5/2019 | Juelsgaard | G05D 1/0231 |
| 2020/0005489 A1* | 1/2020 | Kroeger | G06K 9/4604 |

OTHER PUBLICATIONS

Lakaemper, Rolf, et al. "Using extended EM to segment planar structures in 3D." *18th International Conference on Pattern Recognition (ICPR'06)*. vol. 3. IEEE, 2006.

International Search Report and Written Opinion received in PCT/US2019/057398, dated Dec. 18, 2019.

International Preliminary Report on Patentability issued in corresponding PCT patent application No. PCT/US2019/057398 dated May 11, 2021.

\* cited by examiner

SYSTEMS AND METHODS FOR DETECTING TRAILER ANGLE

BACKGROUND

Technological Field

The described technology generally relates to systems and methods for autonomous driving, and more particularly, to detecting the angle between sections of an articulated vehicle.

Description of the Related Technology

In autonomous driving systems, the accurate perception and prediction of the surrounding driving environment and traffic participants are crucial for making correct and safe decisions for control of the autonomous or host vehicle. Additionally, the autonomous driving system must have accurate measurements of the current state of the vehicle being driven (also referred to as the ego vehicle), for example, of the speed, acceleration, road conditions, and location of the vehicle within the current lane, etc. Certain vehicles, such as a semi-truck having a tractor and at least one trailer, an articulated bus, a train, etc., may have a more complex state due to the additional degrees of freedom provided by a pivot point(s) at which the trailer(s) are attached to the tractor or previous trailer. In this context, the accurate measurement of the angle between the sections of the articulate vehicle is a significant factor used to define the state of the articulated vehicle.

SUMMARY OF CERTAIN INVENTIVE ASPECTS

One inventive aspect is an in-vehicle control system for a tractor and trailer, comprising: an optical sensor configured to be mounted on the tractor and generate optical data indicative of an angle formed between the trailer and the tractor; a processor; and a computer-readable memory in communication with the processor and having stored thereon computer-executable instructions to cause the processor to: receive the optical data, determine at least one candidate plane representative of a surface of the trailer, the candidate plane being visible in the optical data, and determine the angle between the trailer and the tractor based at least on the at least one candidate plane.

Another inventive aspect is a non-transitory computer readable storage medium having stored thereon instructions that, when executed, cause at least one computing device to: receive optical data from an optical sensor, the optical sensor configured to be mounted on a tractor and generate the optical data indicative of an angle formed between a trailer and the tractor; determine at least one candidate plane representative of a surface of the trailer, the candidate plane being visible in the optical data; and determine the angle between the trailer and the tractor based at least on the at least one candidate plane.

Yet another inventive aspect is a method for determining the distance between a vehicle and a lane, comprising: receiving optical data from an optical sensor, the optical sensor configured to be mounted on a tractor and generate the optical data indicative of an angle formed between a trailer and the tractor; determining at least one candidate plane representative of a surface of the trailer, the candidate plane being visible in the optical data; and determining the angle between the trailer and the tractor based at least on the at least one candidate plane.

DETAILED DESCRIPTION OF CERTAIN INVENTIVE EMBODIMENTS

Introduction to in-Vehicle Control Systems

In the following description, for purposes of explanation, numerous specific details are set forth in order to provide a thorough understanding of the various embodiments. It will be evident, however, to one of ordinary skill in the art that the various embodiments may be practiced without these specific details.

As described in various example embodiments, a system and method for detecting trailer angle for an articulated vehicle are described herein. An example embodiment disclosed herein can be used in the context of an in-vehicle control system 150 in a vehicle ecosystem 101. In one example embodiment, an in-vehicle control system 150 with an image processing module 200 resident in a vehicle 105 can be configured like the architecture and ecosystem 101 illustrated in FIG. 1. However, it will be apparent to those of ordinary skill in the art that the image processing module 200 described herein can be implemented, configured, and used in a variety of other applications and systems as well.

Figure 1:
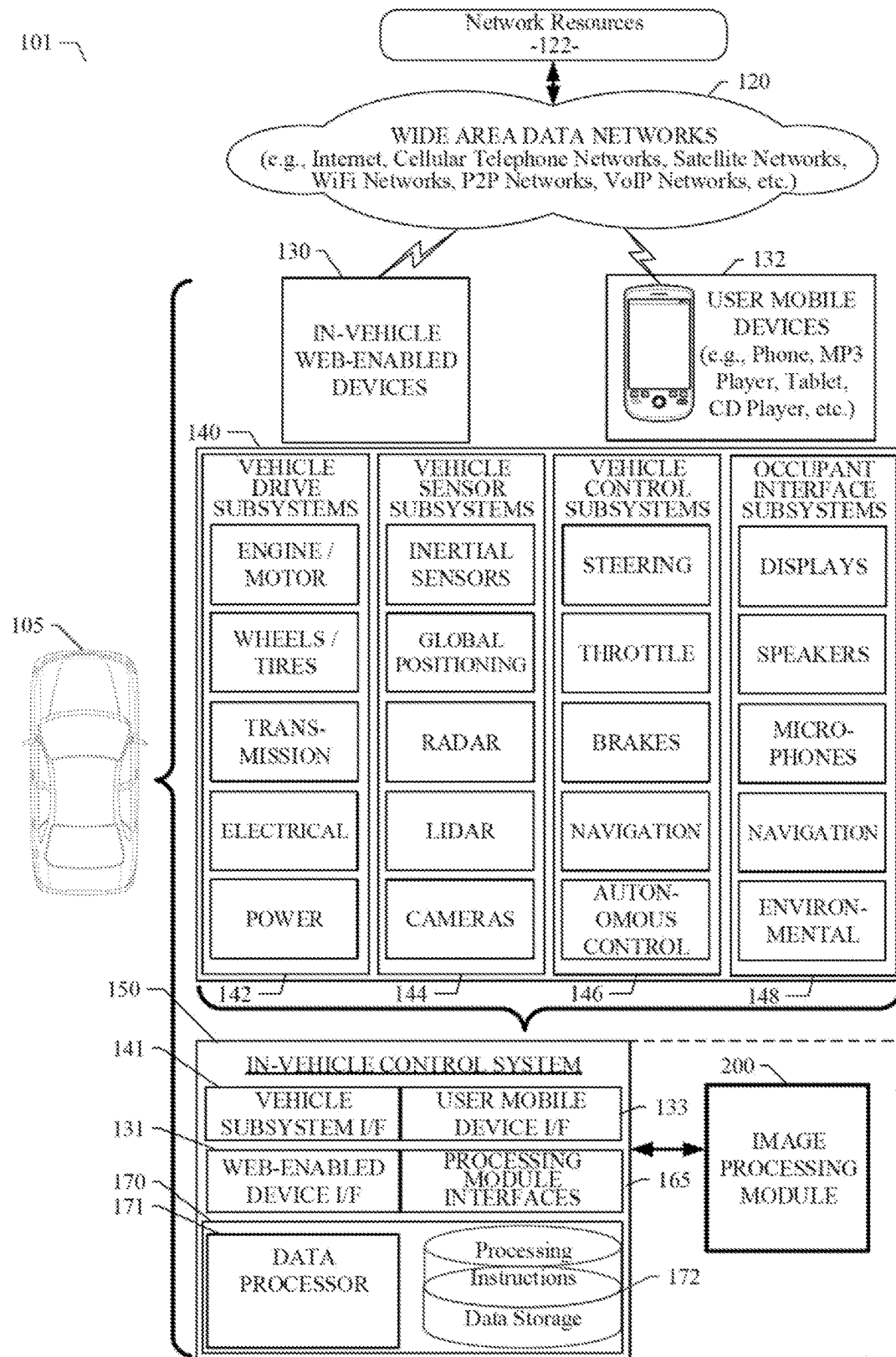
FIG. 1 is a block diagram illustrating an example ecosystem including an in-vehicle control system and an image processing module in accordance with aspects of this disclosure.

With continuing reference to FIG. 1, a block diagram illustrates an example ecosystem 101 in which an in-vehicle control system 150 and an image processing module 200 of an example embodiment can be implemented. These components are described in more detail below. Ecosystem 101 includes a variety of systems and components that can generate and/or deliver one or more sources of information/data and related services to the in-vehicle control system 150 and the image processing module 200, which can be installed in the vehicle 105. For example, a camera installed in the vehicle 105, as one of the devices of vehicle subsystems 140, can generate image and timing data that can be received by the in-vehicle control system 150. The in-vehicle control system 150 and the image processing module 200 executing therein can receive this image and timing data input. As described in more detail below, the image processing module 200 can process the image input and extract object features, which can be used by an autonomous vehicle control subsystem, as another one of the subsystems of vehicle subsystems 140. The autonomous vehicle control subsystem, for example, can use the real-time extracted object features to safely and efficiently navigate and control the vehicle 105 through a real world driving environment while avoiding obstacles and safely controlling the vehicle.

In an example embodiment as described herein, the in-vehicle control system 150 can be in data communication with a plurality of vehicle subsystems 140, all of which can reside in a user's vehicle 105. A vehicle subsystem interface 141 is provided to facilitate data communication between the in-vehicle control system 150 and the plurality of vehicle subsystems 140. The in-vehicle control system 150 can include a data processor 171 configured to execute the image processing module 200 for processing image data received from one or more of the vehicle subsystems 140. The data processor 171 can be combined with a data storage device 172 as part of a computing system 170 in the in-vehicle control system 150. The data storage device 172 can be used to store data, processing parameters, and data processing instructions. A processing module interface 165 can be provided to facilitate data communications between the data processor 171 and the image processing module 200. In various example embodiments, a plurality of processing modules, configured similarly to image processing module 200, can be provided for execution by data processor 171. As shown by the dashed lines in FIG. 1, the image processing module 200 can be integrated into the in-vehicle control system 150, optionally downloaded to the in-vehicle control system 150, or deployed separately from the in-vehicle control system 150.

Figure 2:
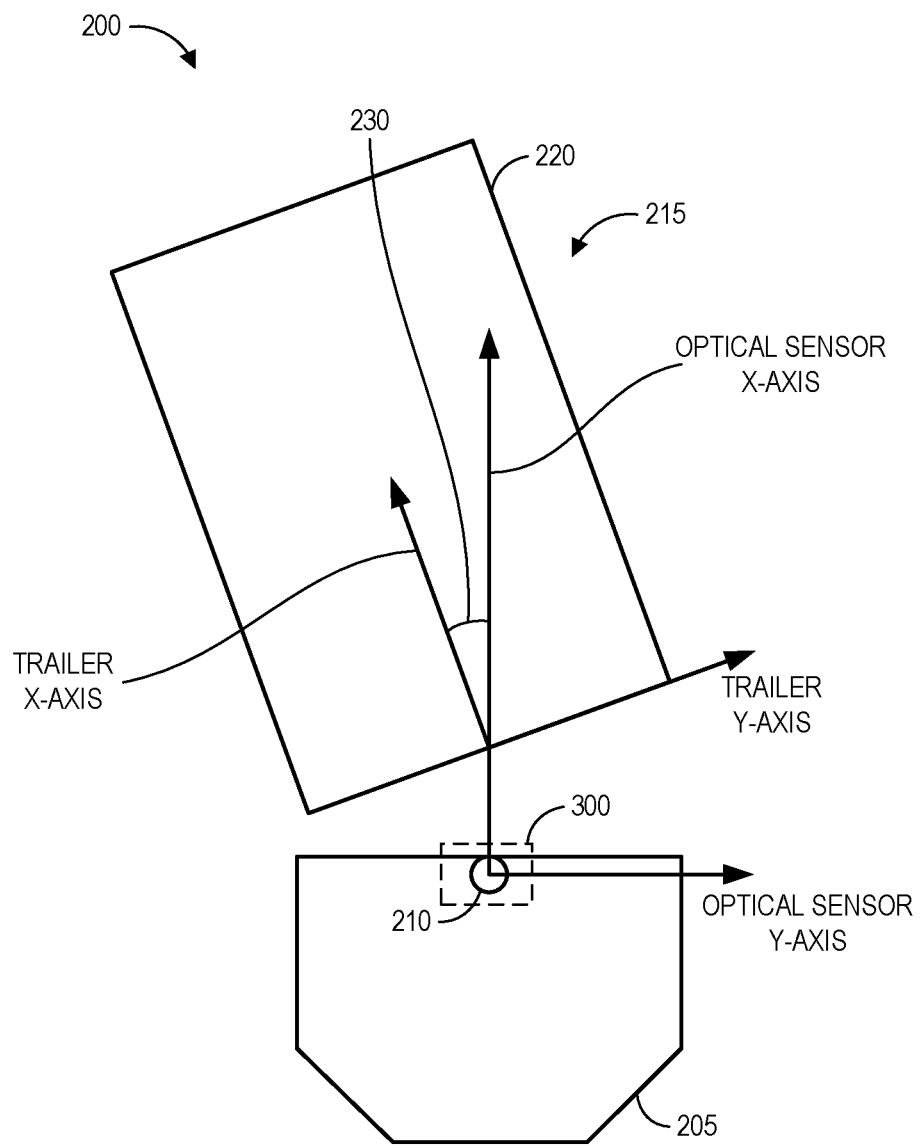
FIG. 2 is a simplified diagram of a semi-truck having a vehicle operational subsystem configured to detect an angle between a tractor and a trailer of the semi-truck in accordance with aspects of this disclosure.
Figure 3:
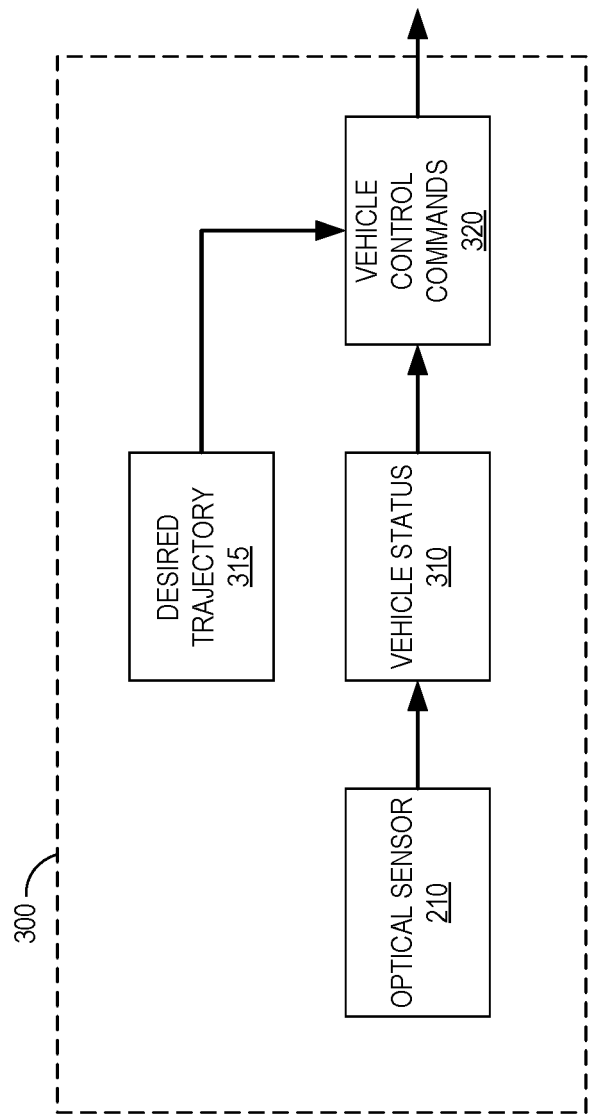
FIG. 3 illustrates an example block diagram of the vehicle operational subsystem for the autonomous control of the semi-truck that has the angle illustrated in FIG. 2 in accordance with aspects of this disclosure.

Although not illustrated in FIG. 1, the in-vehicle control system 150 and/or the vehicle subsystems 140 may include a vehicle operational subsystem 300 (e.g., as shown in FIGS. 2 and 3) configured detect an angle between two adjacent sections of an articulated vehicle. In the case of a semi-truck having a single trailer, the subsystem 300 may be configured to detect and determine the angle formed between a tractor of the semi-truck and the trailer. Further details regarding the subsystem 300 are provided below.

The in-vehicle control system 150 can be configured to receive or transmit data to/from a wide-area network 120 and network resources 122 connected thereto. An in-vehicle web-enabled device 130 and/or a user mobile device 132 can be used to communicate via network 120. A web-enabled device interface 131 can be used by the in-vehicle control system 150 to facilitate data communication between the in-vehicle control system 150 and the network 120 via the in-vehicle web-enabled device 130. Similarly, a user mobile device interface 133 can be used by the in-vehicle control system 150 to facilitate data communication between the in-vehicle control system 150 and the network 120 via the user mobile device 132. In this manner, the in-vehicle control system 150 can obtain real-time access to network resources 122 via network 120. The network resources 122 can be used to obtain processing modules for execution by data processor 171, data content to train internal neural networks, system parameters, or other data.

The ecosystem 101 can include a wide area data network 120. The network 120 represents one or more conventional wide area data networks, such as the Internet, a cellular telephone network, satellite network, pager network, a wireless broadcast network, gaming network, WiFi network, peer-to-peer network, Voice over IP (VoIP) network, etc. One or more of these networks 120 can be used to connect a user or client system with network resources 122, such as websites, servers, central control sites, or the like. The network resources 122 can generate and/or distribute data, which can be received in vehicle 105 via in-vehicle web-enabled devices 130 or user mobile devices 132. The network resources 122 can also host network cloud services, which can support the functionality used to compute or assist in processing image input or image input analysis. Antennas can serve to connect the in-vehicle control system 150 and the image processing module 200 with the data network 120 via cellular, satellite, radio, or other conventional signal reception mechanisms. Such cellular data networks are currently available (e.g., Verizon™, AT&T™, T-Mobile™, etc.). Such satellite-based data or content networks are also currently available (e.g., SiriusXM™, HughesNet™, etc.). The broadcast networks, such as AM/FM radio networks, pager networks, UHF networks, gaming networks, WiFi networks, peer-to-peer networks, Voice over IP (VoIP) networks, and the like are also available. Thus, the in-vehicle control system 150 and the image processing module 200 can receive web-based data or content via an in-vehicle web-enabled device interface 131, which can be used to connect with the in-vehicle web-enabled device receiver 130 and network 120. In this manner, the in-vehicle control system 150 and the image processing module 200 can support a variety of network-connectable in-vehicle devices and systems from within a vehicle 105.

As shown in FIG. 1, the in-vehicle control system 150 and the image processing module 200 can also receive data, image processing control parameters, and training content from user mobile devices 132, which can be located inside or proximately to the vehicle 105. The user mobile devices 132 can represent standard mobile devices, such as cellular phones, smartphones, personal digital assistants (PDA's), MP3 players, tablet computing devices (e.g., iPad™), laptop computers, CD players, and other mobile devices, which can produce, receive, and/or deliver data, image processing control parameters, and content for the in-vehicle control system 150 and the image processing module 200. As shown in FIG. 1, the mobile devices 132 can also be in data communication with the network cloud 120. The mobile devices 132 can source data and content from internal memory components of the mobile devices 132 themselves or from network resources 122 via network 120. Additionally, mobile devices 132 can themselves include a GPS data receiver, accelerometers, WiFi triangulation, or other geo-location sensors or components in the mobile device, which can be used to determine the real-time geo-location of the user (via the mobile device) at any moment in time. In any case, the in-vehicle control system 150 and the image processing module 200 can receive data from the mobile devices 132 as shown in FIG. 1.

Referring still to FIG. 1, the example embodiment of ecosystem 101 can include vehicle operational subsystems 140. For embodiments that are implemented in a vehicle 105, many standard vehicles include operational subsystems, such as electronic control units (ECUs), supporting monitoring/control subsystems for the engine, brakes, transmission, electrical system, emissions system, interior environment, and the like. For example, data signals communicated from the vehicle operational subsystems 140 (e.g., ECUs of the vehicle 105) to the in-vehicle control system 150 via vehicle subsystem interface 141 may include information about the state of one or more of the components or subsystems of the vehicle 105. In particular, the data signals, which can be communicated from the vehicle operational subsystems 140 to a Controller Area Network (CAN) bus of the vehicle 105, can be received and processed by the in-vehicle control system 150 via vehicle subsystem interface 141. Embodiments of the systems and methods described herein can be used with substantially any mechanized system that uses a CAN bus or similar data communications bus as defined herein, including, but not limited to, industrial equipment, boats, trucks, machinery, or automobiles; thus, the term "vehicle" as used herein can include any such mechanized systems. Embodiments of the systems and methods described herein can also be used with any systems employing some form of network data communications; however, such network communications are not required.

Referring still to FIG. 1, the example embodiment of ecosystem 101, and the vehicle operational subsystems 140 therein, can include a variety of vehicle subsystems in support of the operation of vehicle 105. In general, the vehicle 105 may take the form of a car, truck, motorcycle, bus, boat, airplane, helicopter, lawn mower, earth mover, snowmobile, aircraft, recreational vehicle, amusement park vehicle, farm equipment, construction equipment, tram, golf cart, train, and trolley, for example. Other vehicles are possible as well. The vehicle 105 may be configured to operate fully or partially in an autonomous mode. For example, the vehicle 105 may control itself while in the autonomous mode, and may be operable to determine a current state of the vehicle and its environment, determine a predicted behavior of at least one other vehicle in the environment, determine a confidence level that may correspond to a likelihood of the at least one other vehicle to perform the predicted behavior, and control the vehicle 105 based on the determined information. While in autonomous mode, the vehicle 105 may be configured to operate without human interaction.

The vehicle 105 may include various vehicle subsystems such as a vehicle drive subsystem 142, vehicle sensor subsystem 144, vehicle control subsystem 146, and occupant interface subsystem 148. As described above, the vehicle 105 may also include the in-vehicle control system 150, the computing system 170, and the image processing module 200. The vehicle 105 may include more or fewer subsystems and each subsystem could include multiple elements. Further, each of the subsystems and elements of vehicle 105 could be interconnected. Thus, one or more of the described functions of the vehicle 105 may be divided up into additional functional or physical components or combined into fewer functional or physical components. In some further examples, additional functional and physical components may be added to the examples illustrated by FIG. 1.

The vehicle drive subsystem 142 may include components operable to provide powered motion for the vehicle 105. In an example embodiment, the vehicle drive subsystem 142 may include an engine or motor, wheels/tires, a transmission, an electrical subsystem, and a power source. The engine or motor may be any combination of an internal combustion engine, an electric motor, steam engine, fuel cell engine, propane engine, or other types of engines or motors. In some example embodiments, the engine may be configured to convert a power source into mechanical energy. In some example embodiments, the vehicle drive subsystem 142 may include multiple types of engines or motors. For instance, a gas-electric hybrid car could include a gasoline engine and an electric motor. Other examples are possible.

The wheels of the vehicle 105 may be standard tires. The wheels of the vehicle 105 may be configured in various formats, including a unicycle, bicycle, tricycle, or a four-wheel format, such as on a car or a truck, for example. Other wheel geometries are possible, such as those including six or more wheels. Any combination of the wheels of vehicle 105 may be operable to rotate differentially with respect to other wheels. The term wheel may generally refer to a structure comprising a rim configured to be fixedly attached to a tire, which is typically formed of rubber. Optionally, a wheel may include a hubcap attached to an outer surface of the rim or the tire may be exposed to the environment without the inclusion of a hubcap. As used herein, the detection and/or segmentation of a wheel within an image may include the detection of the entire wheel/tire combination, including the rubber tire and the central wheel, when visible.

The wheels of a given vehicle may represent at least one wheel that is fixedly coupled to the transmission and at least one tire coupled to a rim of the wheel that could make contact with the driving surface. The wheels may include a combination of metal and rubber, or another combination of materials. The transmission may include elements that are operable to transmit mechanical power from the engine to the wheels. For this purpose, the transmission could include a gearbox, a clutch, a differential, and drive shafts. The transmission may include other elements as well. The drive shafts may include one or more axles that could be coupled to one or more wheels. The electrical system may include elements that are operable to transfer and control electrical signals in the vehicle 105. These electrical signals can be used to activate lights, servos, electrical motors, and other electrically driven or controlled devices of the vehicle 105. The power source may represent a source of energy that may, in full or in part, power the engine or motor. That is, the engine or motor could be configured to convert the power source into mechanical energy. Examples of power sources include gasoline, diesel, other petroleum-based fuels, propane, other compressed gas-based fuels, ethanol, fuel cell, solar panels, batteries, and other sources of electrical power. The power source could additionally or alternatively include any combination of fuel tanks, batteries, capacitors, or flywheels. The power source may also provide energy for other subsystems of the vehicle 105.

The vehicle sensor subsystem 144 may include a number of sensors configured to sense information about an environment or condition of the vehicle 105. For example, the vehicle sensor subsystem 144 may include an inertial measurement unit (IMU), a Global Positioning System (GPS) transceiver, a RADAR unit, a laser range finder/LIDAR unit, and one or more cameras or image capture devices (e.g., an optical sensor 210 as shown in FIG. 2). The optical sensor may be embodied as a LiDAR detector or a camera (e.g., a conventional visible wavelength camera). The vehicle sensor subsystem 144 may also include sensors configured to monitor internal systems of the vehicle 105 (e.g., an 02 monitor, a fuel gauge, an engine oil temperature). Other sensors are possible as well. One or more of the sensors included in the vehicle sensor subsystem 144 may be configured to be actuated separately or collectively in order to modify a position, an orientation, or both, of the one or more sensors.

The IMU may include any combination of sensors (e.g., accelerometers and gyroscopes) configured to sense position and orientation changes of the vehicle 105 based on inertial acceleration. The GPS transceiver may be any sensor configured to estimate a geographic location of the vehicle 105. For this purpose, the GPS transceiver may include a receiver/transmitter operable to provide information regarding the position of the vehicle 105 with respect to the Earth. The RADAR unit may represent a system that utilizes radio signals to sense objects within the local environment of the vehicle 105. In some embodiments, in addition to sensing the objects, the RADAR unit may additionally be configured to sense the speed and the heading of the objects proximate to the vehicle 105. The laser range finder or LIDAR unit may be any sensor configured to sense objects in the environment in which the vehicle 105 is located using lasers. In an example embodiment, the laser range finder/LIDAR unit may include one or more laser sources, a laser scanner, and one or more detectors, among other system components. The laser range finder/LIDAR unit can be configured to operate in a coherent (e.g., using heterodyne detection) or an incoherent detection mode. The cameras may include one or more devices configured to capture a plurality of images of the environment of the vehicle 105. The cameras may be still image cameras or motion video cameras.

The vehicle control system 146 may be configured to control operation of the vehicle 105 and its components. Accordingly, the vehicle control system 146 may include various elements such as a steering unit, a throttle, a brake unit, a navigation unit, and an autonomous control unit.

The steering unit may represent any combination of mechanisms that may be operable to adjust the heading of vehicle 105. The throttle may be configured to control, for instance, the operating speed of the engine and, in turn, control the speed of the vehicle 105. The brake unit can include any combination of mechanisms configured to decelerate the vehicle 105. The brake unit can use friction to slow the wheels in a standard manner. In other embodiments, the brake unit may convert the kinetic energy of the wheels to electric current. The brake unit may take other forms as well. The navigation unit may be any system configured to determine a driving path or route for the vehicle 105. The navigation unit may additionally be configured to update the driving path dynamically while the vehicle 105 is in operation. In some embodiments, the navigation unit may be configured to incorporate data from the image processing module 200, the GPS transceiver, and one or more predetermined maps so as to determine the driving path for the vehicle 105. The autonomous control unit may represent a control system configured to identify, evaluate, and avoid or otherwise negotiate potential obstacles in the environment of the vehicle 105. In general, the autonomous control unit may be configured to control the vehicle 105 for operation without a driver or to provide driver assistance in controlling the vehicle 105. In some embodiments, the autonomous control unit may be configured to incorporate data from the image processing module 200, the GPS transceiver, the RADAR, the LIDAR, the cameras, and other vehicle subsystems to determine the driving path or trajectory for the vehicle 105. The vehicle control system 146 may additionally or alternatively include components other than those shown and described.

Occupant interface subsystems 148 may be configured to allow interaction between the vehicle 105 and external sensors, other vehicles, other computer systems, and/or an occupant or user of vehicle 105. For example, the occupant interface subsystems 148 may include standard visual display devices (e.g., plasma displays, liquid crystal displays (LCDs), touchscreen displays, heads-up displays, or the like), speakers or other audio output devices, microphones or other audio input devices, navigation interfaces, and interfaces for controlling the internal environment (e.g., temperature, fan, etc.) of the vehicle 105.

In an example embodiment, the occupant interface subsystems 148 may provide, for instance, capabilities for a user/occupant of the vehicle 105 to interact with the other vehicle subsystems. The visual display devices may provide information to a user of the vehicle 105. The user interface devices can also be operable to accept input from the user via a touchscreen. The touchscreen may be configured to sense at least one of a position and a movement of a user's finger via capacitive sensing, resistance sensing, or a surface acoustic wave process, among other possibilities. The touchscreen may be capable of sensing finger movement in a direction parallel or planar to the touchscreen surface, in a direction normal to the touchscreen surface, or both, and may also be capable of sensing a level of pressure applied to the touchscreen surface. The touchscreen may be formed of one or more translucent or transparent insulating layers and one or more translucent or transparent conducting layers. The touchscreen may take other forms as well.

In other instances, the occupant interface subsystems 148 may provide capabilities for the vehicle 105 to communicate with devices within its environment. The microphone may be configured to receive audio (e.g., a voice command or other audio input) from a user of the vehicle 105. Similarly, the speakers may be configured to output audio to a user of the vehicle 105. In one example embodiment, the occupant interface subsystems 148 may be configured to wirelessly communicate with one or more devices directly or via a communication network. For example, a wireless communication system could use 3G cellular communication, such as CDMA, EVDO, GSM/GPRS, or 4G cellular communication, such as WiMAX or LTE. Alternatively, the wireless communication system may communicate with a wireless local area network (WLAN), for example, using WIFI®. In some embodiments, the wireless communication system 146 may communicate directly with a device, for example, using an infrared link, BLUETOOTH®, or ZIGBEE®. Other wireless protocols, such as various vehicular communication systems, are possible within the context of the disclosure. For example, the wireless communication system may include one or more dedicated short range communications (DSRC) devices that may include public or private data communications between vehicles and/or roadside stations.

Many or all of the functions of the vehicle 105 can be controlled by the computing system 170. The computing system 170 may include at least one data processor 171 (which can include at least one microprocessor) that executes processing instructions stored in a non-transitory computer readable medium, such as the data storage device 172. The computing system 170 may also represent a plurality of computing devices that may serve to control individual components or subsystems of the vehicle 105 in a distributed fashion. In some embodiments, the data storage device 172 may contain processing instructions (e.g., program logic) executable by the data processor 171 to perform various functions of the vehicle 105, including those described herein in connection with the drawings. The data storage device 172 may contain additional instructions as well, including instructions to transmit data to, receive data from, interact with, or control one or more of the vehicle drive subsystem 142, the vehicle sensor subsystem 144, the vehicle control subsystem 146, and the occupant interface subsystems 148.

In addition to the processing instructions, the data storage device 172 may store data such as image processing parameters, training data, roadway maps, and path information, among other information. Such information may be used by the vehicle 105 and the computing system 170 during the operation of the vehicle 105 in the autonomous, semi-autonomous, and/or manual modes.

The vehicle 105 may include a user interface for providing information to or receiving input from a user or occupant of the vehicle 105. The user interface may control or enable control of the content and the layout of interactive images that may be displayed on a display device. Further, the user interface may include one or more input/output devices within the set of occupant interface subsystems 148, such as the display device, the speakers, the microphones, or a wireless communication system.

The computing system 170 may control the function of the vehicle 105 based on inputs received from various vehicle subsystems (e.g., the vehicle drive subsystem 142, the vehicle sensor subsystem 144, and the vehicle control subsystem 146), as well as from the occupant interface subsystem 148. For example, the computing system 170 may use input from the vehicle control system 146 in order to control the steering unit to avoid an obstacle detected by the vehicle sensor subsystem 144 and the image processing module 200, move in a controlled manner, or follow a path or trajectory based on output generated by the image processing module 200. In an example embodiment, the computing system 170 can be operable to provide control over many aspects of the vehicle 105 and its subsystems.

Although FIG. 1 shows various components of vehicle 105, e.g., vehicle subsystems 140, computing system 170, data storage device 172, and image processing module 200, as being integrated into the vehicle 105, one or more of these components could be mounted or associated separately from the vehicle 105. For example, data storage device 172 could, in part or in full, exist separate from the vehicle 105. Thus, the vehicle 105 could be provided in the form of device elements that may be located separately or together. The device elements that make up vehicle 105 could be communicatively coupled together in a wired or wireless fashion.

Additionally, other data and/or content (denoted herein as ancillary data) can be obtained from local and/or remote sources by the in-vehicle control system 150 as described above. The ancillary data can be used to augment, modify, or train the operation of the image processing module 200 based on a variety of factors including, the context in which the user is operating the vehicle (e.g., the location of the vehicle, the specified destination, direction of travel, speed, the time of day, the status of the vehicle, etc.), and a variety of other data obtainable from the variety of sources, local and remote, as described herein.

In a particular embodiment, the in-vehicle control system 150 and the image processing module 200 can be implemented as in-vehicle components of vehicle 105. In various example embodiments, the in-vehicle control system 150 and the image processing module 200 in data communication therewith can be implemented as integrated components or as separate components. For example, the image processing module 200 can be included as a set of instructions stored in a non-transitory computer readable medium, such as the data storage device 172, for causing the data processor 171 to perform various image processing functionality. In an example embodiment, the software components of the in-vehicle control system 150 and/or the image processing module 200 can be dynamically upgraded, modified, and/or augmented by use of the data connection with the mobile devices 132 and/or the network resources 122 via network 120. The in-vehicle control system 150 can periodically query a mobile device 132 or a network resource 122 for updates or updates can be pushed to the in-vehicle control system 150.

Systems and Methods for Determining Tractor to Trailer Angle

In the various example embodiments disclosed herein, a system and method are provided for detecting the angle between adjacent sections of an articulated vehicle, which may be used for autonomous driving of the vehicle. Embodiments of the articulated vehicle include a semi-truck having a tractor and at least one trailer, an articulated bus, a train, etc.

FIG. 2 is a simplified diagram of a semi-truck having a vehicle operational subsystem configured to detect an angle between a tractor and a trailer of the semi-truck in accordance with aspects of this disclosure. As shown in FIG. 2, the semi-truck 200 includes a tractor 205 coupled to a trailer 215. The trailer 215 may include a container 220 in which goods are configured to be stored during transportation. The trailer 215 may be connected to the tractor 205 at a pivot point, for example, via a fifth wheel configuration including a fifth wheel coupling device (not illustrated) installed on the tractor 205 and a kingpin (not illustrated) installed on the trailer 215. However, other embodiments may employ other configurations used to couple the trailer 215 to the tractor 205. Further, the tractor 205 may include vehicle operational subsystems 140 (not illustrated) and/or an in-vehicle control system 150 (not illustrated) including a vehicle operational subsystem 300.

Since the trailer 215 is configured to pivot around the coupling point with the tractor 205 (e.g., at the fifth wheel connection point), the angle formed between the trailer 215 and the tractor 205 may vary as the tractor 205 moves or is driven autonomously. The current angle between the tractor 205 and the trailer 215 is a significant variable which can be used to define the current state of the semi-truck 200, since the angle may affect the overall center of gravity of the semi-truck 200, the path taken by the trailer 215 during driving, the wind resistance of the semi-truck 200, etc. An accurate measurement of the angle between the tractor 205 and the trailer 215 may also be of significance during sharp turns, where there is a possibility that the trailer 215 may collide with a portion of the tractor 205, and during hard breaking of the semi-truck 200, which has the potential to lead to jackknifing of the trailer 215. Since jackknifing in particular can be dangerous, detection of the conditions under which jackknifing can occur, including the tractor 205 to trailer 215 angle can improve the safety of the vehicle when driven autonomously.

One possible technique for measuring the angle between the tractor 205 and the trailer 215 may involve installing an angular sensor on the kingpin of the trailer 215 configured to measure the angle between the trailer 215 and the tractor 205. However, there may be a number of drawbacks associated with the angular sensor installed on the trailer 215. For example, the fifth wheel coupling between the tractor 205 and the trailer 215 may involve the transmission of large forces through the fifth wheel coupling mechanism, some of which may be imparted on the angular sensor. These forces may lead to early wear and tear on the angular sensor, which may require frequent replacement due to high failure rates of the angular sensor. Additionally, the logistics associated with transportation using semi-trucks may involve the tractor 205 coupling with and hauling a number of different trailers 215, each of which may be manufactured by a different producer. Thus, the angular sensors installed in each trailer 215 would have to be manually connected and set up to properly interface with the in-vehicle control system 150 in the tractor 205. This set up involves extra time and expertise for the driver and/or loading staff, leading to a source of inefficiency when coupling/uncoupling trailers 215 from the tractor 205.

Additionally, the use of an angular sensor installed on the trailer 215 may be capable of providing only a single point of measurement of the tractor 205 to trailer 215 angle. Thus, if the measurement accuracy of the angular sensor deteriorates, all measurements provided to the in-vehicle control system 150 will suffer, reducing the ability of the in-vehicle control system 150 to autonomously control the semi-truck 200.

Aspects of this disclosure may address one or more of the above-described drawbacks. For example, the tractor 205 may include an optical sensor 210. In certain embodiments, the optical sensor 210 is installed facing the trailer 215. The optical sensor 210 may face the trailer 215 from the rear of the tractor 215 to obtain image(s) of the trailer. With continued reference to FIG. 2, an X-axis and a Y-axis may be defined for each of the optical sensor 210 and a reference point on the trailer 215. In some embodiments, an angle 230 between the optical sensor X-axis and the trailer X-axis may be defined as the angle between the tractor 205 and the trailer 215.

Depending on the implementation, the optical sensor 210 may be embodied as a LiDAR detector 211 or a camera 213 (e.g., a conventional visible wavelength camera). However, aspects of this disclosure are not limited to these embodiments and the optical sensor 210 may also be embodied as an infrared camera, a multi spectrum camera, a RADAR, etc.

The optical sensor 210 may provide raw or partially processed data to one or more processors which may determine the angle 230 using the received data. The one or more processors may include a processor integrated in the optical sensor 210, the data processor 171, and/or a processor included in the vehicle subsystems 140. For the sake of clarity, the set of one or more processors may be referred to simply as the singular "processor" herein.

FIG. 3 illustrates an example block diagram of the vehicle operational subsystem for the autonomous control of the semi-truck that has the angle 230 illustrated in FIG. 2 in accordance with aspects of this disclosure. The illustrated system 300 may include the optical sensor 210. In certain embodiments, the optical sensor 210 is configured to output optical data indicative of the angle of the trailer 215 with respect to the tractor 205. The optical sensor 210 may be installed on the tractor 205 as shown in FIG. 2, and thus, the optical data may include data representative of at least a portion of the surface of the trailer 215 visible from the point of view of the optical sensor 210. In some embodiments, the optical data may include point cloud data including a set of data points representative of the location of a surface of the trailer 215 in space.

At block 310, a processor may determine the vehicle state using the optical sensor data received from the optical sensor 210. This may include determining the angle (e.g., the angle 230) between the trailer 215 and the tractor 205. In addition, the vehicle state determined in block 310 may include other variables defining a current (or past) state of the semi-truck 200, including the semi-truck's 200 speed, acceleration/breaking, current lane position, GPS position, etc. At block 320, the processor may use the determined vehicle state and a desired trajectory 315 to determine appropriate vehicle control commands 320 to autonomously drive the semi-truck 200 in accordance with the desired trajectory 315.

Figure 4:
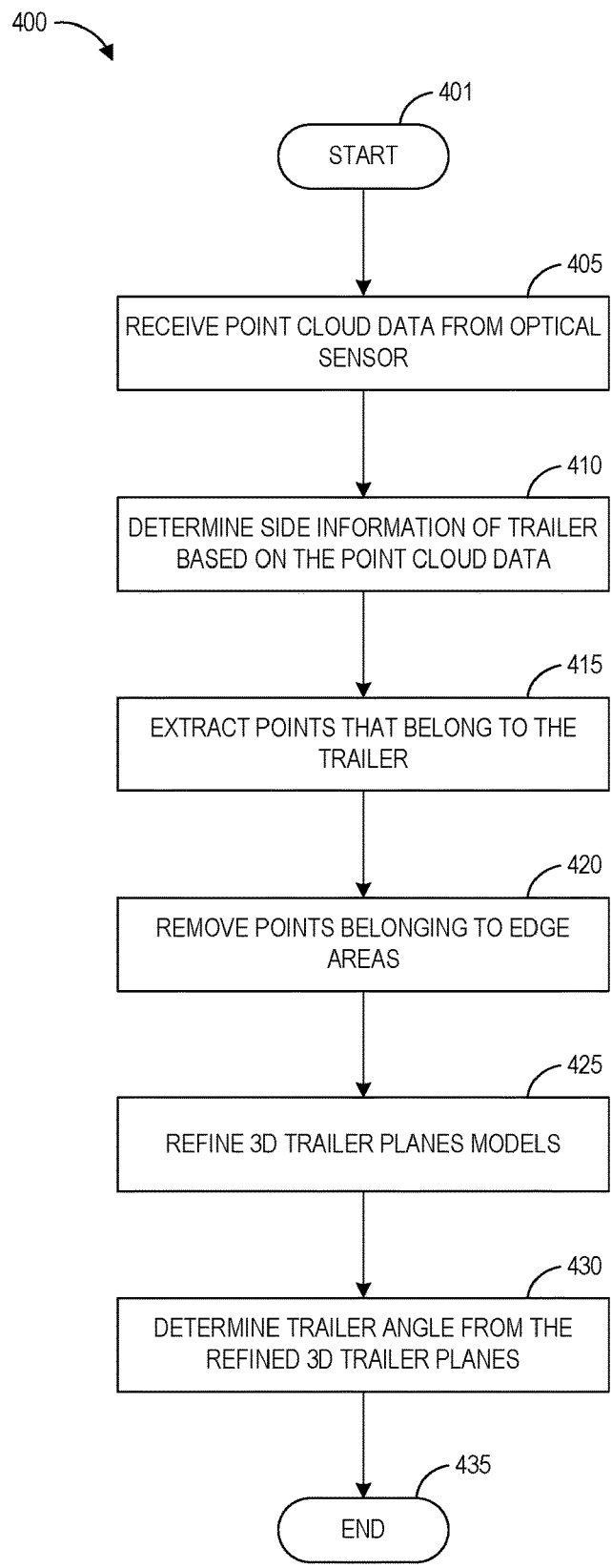
FIG. 4 illustrates an example method which can be used to determine the angle illustrated in FIG. 2 in accordance with aspects of this disclosure.

FIG. 4 illustrates an example method which can be used to determine the angle 230 illustrated in FIG. 2 in accordance with aspects of this disclosure. The method 400 begins at block 401. At block 405, the processor receives point cloud data from the optical sensor 210 illustrated in FIG. 2. However, in other embodiments, the processor may receive optical data from the optical sensor 210, which may include data representative of at least a portion of the surface of the trailer 215 visible from the point of view of the optical sensor 210 in a form other than a point cloud. In some of these embodiments, the processor may be configured to generate a point cloud including a set of data points representative of the location of a surface of the trailer 215 in space from the optical sensor data.

At block 410, the processor determines side information of the trailer 215 based on the point cloud data received from the optical sensor 210. As used herein, side information may refer to data representative of the shape of the external surfaces of the trailer 215. This may involve detecting markers on the side of the container 220 using an approach which is based on the type of the optical sensor 210. For example, when the optical sensor 210 is embodied as a LiDAR detector 211, the processor may extract points from the point cloud data with a reflectance value lower than a threshold reflectance value. The processor may then group the extracted points into clusters based on the distance between the extracted points. For example, points that are within a threshold distance from each other may be grouped together. The processor may also extract shape feature(s) from each cluster of points. The extraction of shape feature(s) may be performed using any technique for identifying shapes from clusters of points, for example, using standard image processing techniques which identify shape feature(s) in images. The processor may also identify and/or assign a marker ID for each of the clusters of points based on the extracted shape feature(s).

In the embodiment where the optical sensor 210 is embodied as the camera 213, the processor may perform an alternative technique at block 410. For example, the processor may detect a quick response (QR) code in the image. In this embodiment, one or more QR codes may be attached (e.g., via magnets, adhesive, etc.) to the trailer 215 within the expected field of view of the camera 213. The camera 213 may identify the QR codes as a part of determining the side information of the trailer 215. The processor may further determine QR code 3D position data using projected LiDAR points from the LiDAR detector 211 to camera calibration.

At block 415, the processor extracts points from the point cloud data that belong to the trailer 215. In some embodiments, the processor may use a random sample consensus (RANSAC)-based plane fitting algorithm to detect all the candidate 3D planes in the point cloud. That is, the processor may determine a set of candidate 3D planes which can be used to represent the plane of the visible side of the trailer 215 that are consistent with the point cloud data obtained in block 405. For each of the candidate planes, the processor may calculate the distance from the plane to the closest marker determined in block 410. The processor may also, for each of the candidate planes, determine that the candidate plane belongs to the container 220 when the distance from the plane to the closest marker is less than a predefined threshold distance. The processor may extract K container planes (where $P_k, k \in [1, K]$) from all the candidate planes determined to belong to the container 220. The processor may also construct a container planes point cloud by extracting points from the point cloud data that belong to the extracted container planes. For each points $X_i$, the processor may store a mapping $k = m(X_i)$ for the correspondence between the points $X_i$ and the index(k) of the corresponding container plane.

At block 420, the processor removes points from the point cloud data which belong to edge areas of the trailer 215. For example, for each point in the container planes point cloud, the processor may use the current point as a reference point and determine the reference point's N closest points. The processor may define the N closest points as neighboring points for the reference point. The processor may also use least square fitting to fit a 3D plane from the neighboring points of the reference point. The processor may also calculate the sum of distance from neighboring points to the fitted plane and, when the sum of distance is greater than a predefined threshold, the processor may determine that the reference point belongs to the edge areas. The processor may then remove points determined to belong to the edge areas from the container planes point cloud.

At block 425, the processor refines 3D trailer planes models. In certain embodiments, an objective function may be used to optimize the 3D trailer points. For example, in some implementations, the 3D trailer points may comprise noise. However, since the general shape of the trailer 215 in the real world will not have noise (e.g., the shapes of trailers 215 are predictable), the processor can construct the objective function to refine the 3D trailer planes models by reducing the noise in the 3 trailer points that is inconsistent with the expected trailer 215 shape. In certain embodiments, the objective function may include one or more of the following variables: the models of K container planes, N 3D points in container planes point cloud, the mapping stored in block 420, a function that relates the distance from 3D point $X_i$ to plane, and a penalty function for violating the constraint that the normals of plane are perpendicular. By optimizing the objective function, the processor can refine the 3D trailer planes model.

At block 430, the processor determines the angle 230 from the refined 3D trailer planes. In some embodiments, the processor can determine the angle 230 from the normals of the optimal 3D container planes determined in block 425. The method 400 ends at block 435.

Figure 5:
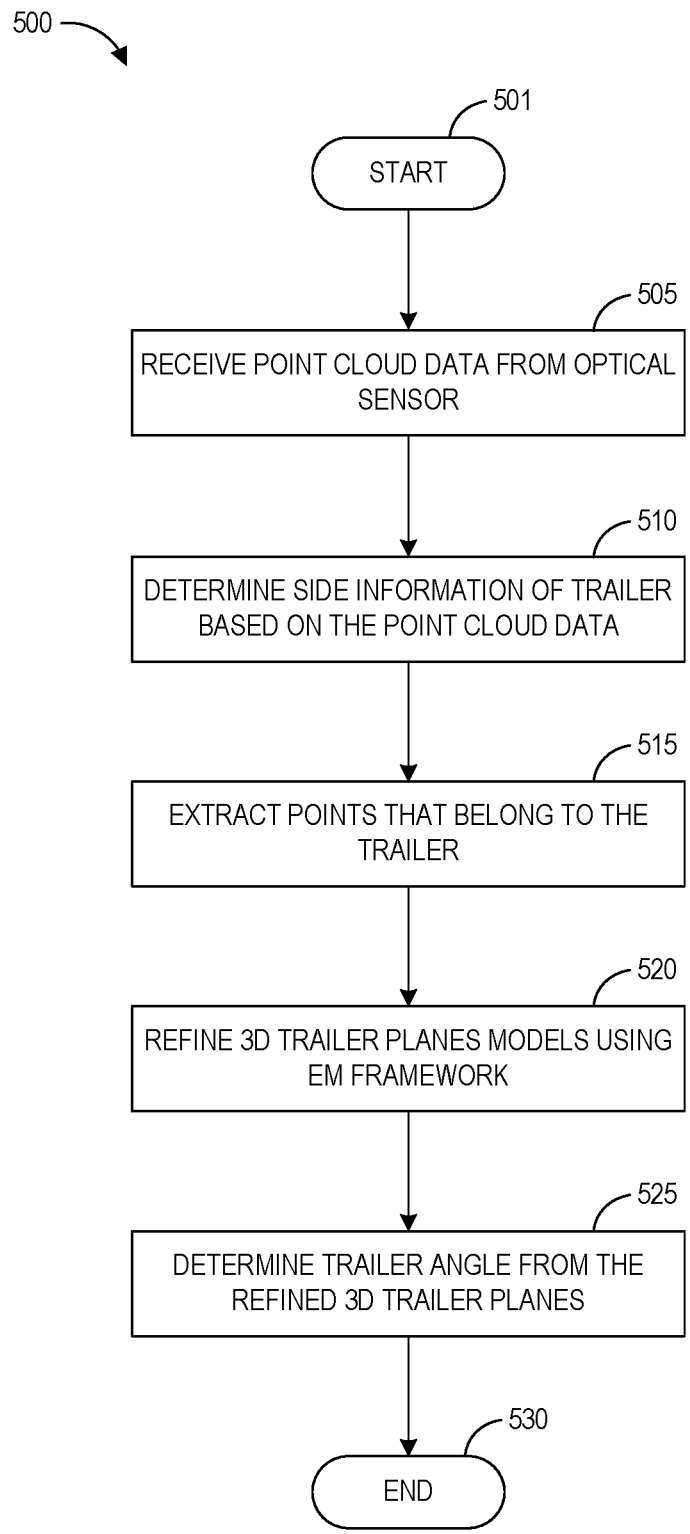
FIG. 5 illustrates another example method which can be used to determine tractor to trailer angle in accordance with aspects of this disclosure.

FIG. 5 illustrates another example method which can be used to determine the angle 230 illustrated in FIG. 2 in accordance with aspects of this disclosure. The method 500 begins at block 501. At block 505, the processor receives point cloud data from the optical sensor 210 illustrated in FIG. 2.

At block 510, the processor determines side information of the trailer 215 based on the point cloud data received from the optical sensor 210. Block 510 may be implemented in a similar fashion to block 410 of FIG. 4. This may involve a different technique depending on the particular embodiment of the optical sensor 210 (e.g., whether embodied as the LiDAR detector 211 or the camera 213).

At block 515, the processor extracts points from the point cloud data that belong to the trailer 215. In some embodiments, the processor may use a random sample consensus (RANSAC)-based plane fitting algorithm to detect all the candidate 3D planes in the point cloud. That is, the processor may determine a set of candidate 3D planes which can be used to represent the plane of the visible side of the trailer 215 that are consistent with the point cloud data obtained in block 505. For each of the candidate planes, the processor may calculate the distance from the plane to the closest marker determined in block 510. The processor may also, for each of the candidate planes, determine that the candidate plane belongs to the container 220 when the distance from the plane to the closest marker is less than a predefined threshold distance. The processor may extract K container planes (where $P_k, k \in [1,K]$) from all the candidate planes determined to belong to the container 220. The processor may also construct a container planes point cloud by extracting points from the point cloud data that belong to the extracted container planes.

At block 520, the processor refines 3D trailer planes models using an expectation-maximization (EM) framework. The EM framework may include performing an iteration of a process. For example, at the E-step of the t iteration, the processor may determine a mapping function $m^t(X_i)$ to determine the index of the corresponding container plane for 3D point $X_i$. For each 3D point $X_i$, the mapping function $m^t(X_i)$ may be the distance from the 3D point $X_i$ to the plane $P^{t-1}_j$. The plane may be the model of the container planes at the t−1 iteration. At the M-step of the t iteration, an objective function may be defined which may be optimized to refine the 3D trailer points. After iterating through the steps of the objective function, the objective function may converge on a stable result, thereby optimizing the 3D trailer points. In certain embodiments, the objective function may include one or more of the following variables: the models of K container planes at the t−1 iteration, N 3D points in container planes point cloud, the mapping determined during the E-step of the iteration, the function that relates the distance from 3D point $X_i$ to plane, and a penalty function for violating the constraint that the normals of plane are perpendicular. By optimizing the objective function, the processor can refine the 3D trailer planes model. The E-step and M-step may be iterated until convergence to obtain the final optimal 3D container planes models.

At block 525, the processor determines the angle 230 from the refined 3D trailer planes. In some embodiments, the processor can determine the angle 230 from the normals of the optimal 3D container planes determined in block 520. The method 500 ends at block 535.

While there have been shown and described and pointed out the fundamental novel features of the invention as applied to certain inventive embodiments, it will be understood that the foregoing is considered as illustrative only of the principles of the invention and not intended to be exhaustive or to limit the invention to the precise forms disclosed. Modifications or variations are possible in light of the above teachings. The embodiments discussed were chosen and described to provide the best illustration of the principles of the invention and its practical application to enable one of ordinary skill in the art to utilize the invention in various embodiments and with various modifications as are suited to the particular use contemplate. All such modifications and variations are within the scope of the invention as determined by the appended claims when interpreted in accordance with the breadth to which they are entitled.

What is claimed is:

1. An in-vehicle control system for a tractor and trailer, comprising:
   an optical sensor configured to be mounted on the tractor and generate optical data indicative of an angle formed between the trailer and the tractor;
   a processor; and
   a computer-readable memory in communication with the processor and having stored thereon computer-executable instructions to cause the processor to:
      receive the optical data, the optical data comprising point cloud data,
      detect one or more markers on a surface of the trailer via identifying points from the point cloud data having a reflectance value lower than a threshold reflectance value,
      determine at least one candidate plane representative of the surface of the trailer based on the point cloud data, the candidate plane being visible in the optical data, and
      determine the angle between the trailer and the tractor based at least on the at least one candidate plane and the one or more markers.

2. The system of claim 1, wherein the optical sensor is positioned so as to face the trailer.

3. The system of claim 1, wherein the optical sensor comprises a LiDAR detector configured to generate the optical data indicative of a spatial position of a visible surface of the trailer.

4. The system of claim 1, wherein the optical sensor comprises a camera configured to generate an image comprising a representation of the one or more markers on the surface of the trailer.

5. The system of claim 4, wherein the one or more markers comprise a quick response (QR) code.

6. The system of claim 1, wherein:
the points of the point cloud data are representative of the location of the surface of the trailer in space, and
the memory further has stored thereon computer-executable instructions to cause the processor to:
remove points belonging to edge areas of the trailer from the identified points to define a remaining subset of identified points,
wherein determining the at least one candidate plane is performed based on the remaining subset of identified points.

7. The system of claim 1, wherein the memory further has stored thereon computer-executable instructions to cause the processor to:
refine the at least one candidate plane using an expectation-maximization framework comprising a plurality of iterations of: i) an expectation step comprising determining a mapping function and ii) a maximization step comprising optimizing an objective function.

8. The system of claim 1, wherein the memory further has stored thereon computer-executable instructions to cause the processor to:
determine that a set of the identified points are within a first threshold distance from each other, and
group the set of identified points into a cluster corresponding to one of the one or more markers.

9. The system of claim 8, wherein the memory further has stored thereon computer-executable instructions to cause the processor to:
determine a shape feature from the cluster, and
assign a marker identifier to the cluster based on the shape feature.

10. The system of claim 9, wherein the memory further has stored thereon computer-executable instructions to cause the processor to:
determine that a distance from the at least one candidate plane to the marker corresponding to the marker identifier is less than a second threshold distance, and
determine that the at least one candidate plane belongs to the surface of the trailer in response to determining that the distance from the at least one candidate plane to the marker is less than the second threshold distance,
wherein the determining of the angle between the trailer and the tractor is performed in response to determining that the at least one candidate plane belongs to the surface of the trailer.

11. A non-transitory computer readable storage medium having stored thereon instructions that, when executed, cause at least one computing device to:
receive optical data from an optical sensor, the optical data comprising point cloud data, the optical sensor configured to be mounted on a tractor and generate the optical data indicative of an angle formed between a trailer and the tractor;
detect one or more markers on a surface of the trailer via identifying points from the point cloud data having a reflectance value lower than a threshold reflectance value;
determine at least one candidate plane representative of the surface of the trailer based on the point cloud data, the candidate plane being visible in the optical data; and
determine the angle between the trailer and the tractor based at least on the at least one candidate plane and the one or more markers.

12. The non-transitory computer readable storage medium of claim 11, wherein the optical sensor comprises at least one of the following: an infrared sensor, a multi spectral camera, and a RADAR.

13. The non-transitory computer readable storage medium of claim 11, wherein:
the points of the point cloud data are representative of the location of a surface of the trailer in space, and
the non-transitory computer readable storage medium further has stored thereon instructions that, when executed, cause at least one computing device to:
reduce noise in the points of the point cloud data representative of the location of the surface of the trailer that are inconsistent with an expected shape of the trailer,
wherein determining the at least one candidate plane is performed based on the points having reduced noise.

14. The non-transitory computer readable storage medium of claim 11, wherein the non-transitory computer readable storage medium further has stored thereon instructions that, when executed, cause at least one computing device to:
using a plane fitting algorithm to detect the at least one candidate plane in the point cloud data.

15. The non-transitory computer readable storage medium of claim 14, wherein:
the plane fitting algorithm is further configured to detect a plurality of candidate planes in the point cloud data including the at least one candidate plane.

16. The non-transitory computer readable storage medium of claim 15, wherein the non-transitory computer readable storage medium further has stored thereon instructions that, when executed, cause at least one computing device to:
for each one of the plurality of candidate planes, determine a distance from a current one of the candidate planes to a first one of the one or more markers, and
determine that the current one of the candidate planes belongs to the trailer in response to the distance from the current one of the candidate planes to the first marker being less than a threshold distance.

17. A method for determining an angle between a tractor and a trailer, comprising:
receiving optical data from an optical sensor, the optical data comprising point cloud data, the optical sensor configured to be mounted on the tractor and generate the optical data indicative of the angle formed between the trailer and the tractor;
detecting one or more markers on a surface of the trailer via identifying points from the point cloud data having a reflectance value lower than a threshold reflectance value;
determining at least one candidate plane representative of the surface of the trailer based on the point cloud data, the candidate plane being visible in the optical data; and determining the angle between the trailer and the tractor based at least on the at least one candidate plane and the one or more markers.

18. The method of claim 17, further comprising:
constructing an objective function,
optimizing the point cloud data using the objective function.

19. The method of claim 18, wherein the objective function includes one or more of the following variables: models of K container planes, N 3D points in the point cloud data, a mapping stored between one or more of the points in the point cloud data and the at least one candidate plane, a function that relates a distance from one or more of the points in the point cloud data to the at least one candidate plane, and a penalty function for violating a constraint that normals of the at least one candidate plane are perpendicular to each other.

20. The method of claim 17, further comprising:
refining the at least one candidate plane using an expectation-maximization (EM) framework, the EM framework comprising an E-step and an M-step,
wherein the E-step and the M-step of the EM framework are iterated until convergence.

* * * * *